United States Patent [19]

Sekiyama et al.

[11] 4,389,607
[45] Jun. 21, 1983

[54] SYNCHRONOUS MOTOR CONTROL DEVICE

[75] Inventors: Nobuo Sekiyama; Hisato Miyamura, both of Hitachi, Japan

[73] Assignee: Hitachi, Ltd., Tokyo, Japan

[21] Appl. No.: 184,068

[22] Filed: Sep. 4, 1980

[30] Foreign Application Priority Data

Sep. 5, 1979 [JP] Japan .................................. 54-112980

[51] Int. Cl.³ .............................................. H02P 5/40
[52] U.S. Cl. ....................................... 318/717; 318/729
[58] Field of Search ........................ 318/729, 717, 714; 323/213, 217; 318/798

[56] References Cited

U.S. PATENT DOCUMENTS 3,145,332  8/1964  MacGregor ......................... 318/717
3,383,575  5/1968  Bobo .................................... 318/717
3,686,551  8/1972  Peterson .............................. 318/717
3,686,552  8/1972  Peterson .............................. 318/717

OTHER PUBLICATIONS

Nola, F. J., "Circuit Waves Power in AC Induction Motors", *EDN*, Sep. 5, 1979, pp. 185–189.
Pascente, J., "Energy-Saving Motor Control", *New Electronics*, vol. 12, No. 7, Apr. 3, 1979.
Smith, I. R., "Motor Performance Improved by Excitation Control", *Control & Instrumentaion*, Feb. 1973, pp. 38–40.

*Primary Examiner*—David Smith, Jr.
*Attorney, Agent, or Firm*—Antonelli, Terry & Wands

[57] ABSTRACT

A voltage $V_{ac}$ of a synchronous motor is converted into positive and negative voltages of a predetermined magnitude relative to the ground during the positive and negative half-wave periods, respectively. The voltage is delivered during the positive and negative periods of a current $I_b$ and is used as a signal representing a power factor. The difference between a target value of the power factor and the signal representing the power factor thus delivered is used for compensating for the difference between a target current of a field system and a feed-back signal thereby to control a field current.

10 Claims, 10 Drawing Figures

SYNCHRONOUS MOTOR CONTROL DEVICE

BACKGROUND OF THE INVENTION

This invention relates to a synchronous motor control device. Since a synchronous motor is capable of having its power factor optionally controlled by controlling the field current, it has gained a wide application in driving equipment having relatively constant load or speed such as a kiln, a blower and the like. One of the primary reasons for driving the load of this kind by the synchronous motor is to control the power factor to an optional value and to improve the overall power factor including other loads. Accordingly, it is essential that a control device of a synchronous motor be capable of quickly detecting the change in the power factor of the synchronous motor so that it can supply a suitable field current control signal.

This power factor detection has conventionally been carried out by comparing the phase relationship between a predetermined voltage and current of the synchronous motor and obtaining a pulse signal that continues during the period of the predetermined phase relationship, e.g., the period in which both have the positive polarity, to make use of them as a power factor signal. As typical prior art of this type, mention can be made of Japanese Patent Publication No. 2488/1968. Accordingly, a signal representing the power factor can be obtained as a pulse signal only once a cycle (or a half cycle) of the electric power source of the synchronous motor.

The control device takes an average of this pulse signal by use of a smoothing circuit and uses the mean value as the power factor signal. For this reason, the conventional control device has large response delay due to the smoothing circuit and fails to sufficiently exhibit satisfactory control functions.

SUMMARY OF THE INVENTION

It is, therefore, an object of the present invention to provide a synchronous motor control device capable of improving upon the abovementioned drawback.

It is another object of the present invention to provide a synchronous motor control device equipped with a power factor detection device in which a signal representing the power factor for the whole period of one cycle of the power source is generated.

The present invention is characterized in that either one of voltage and current of a synchronous motor is used as a reference while the other is continuously delivered as a signal representing the power factor for controlling the field current.

These and other objects and features of the present invention will become more apparent from the following description to be read in conjunction with the accompanying drawings.

DETAILED DESCRIPTION OF THE PREFERRED EMBODIMENT

Figure 1A:
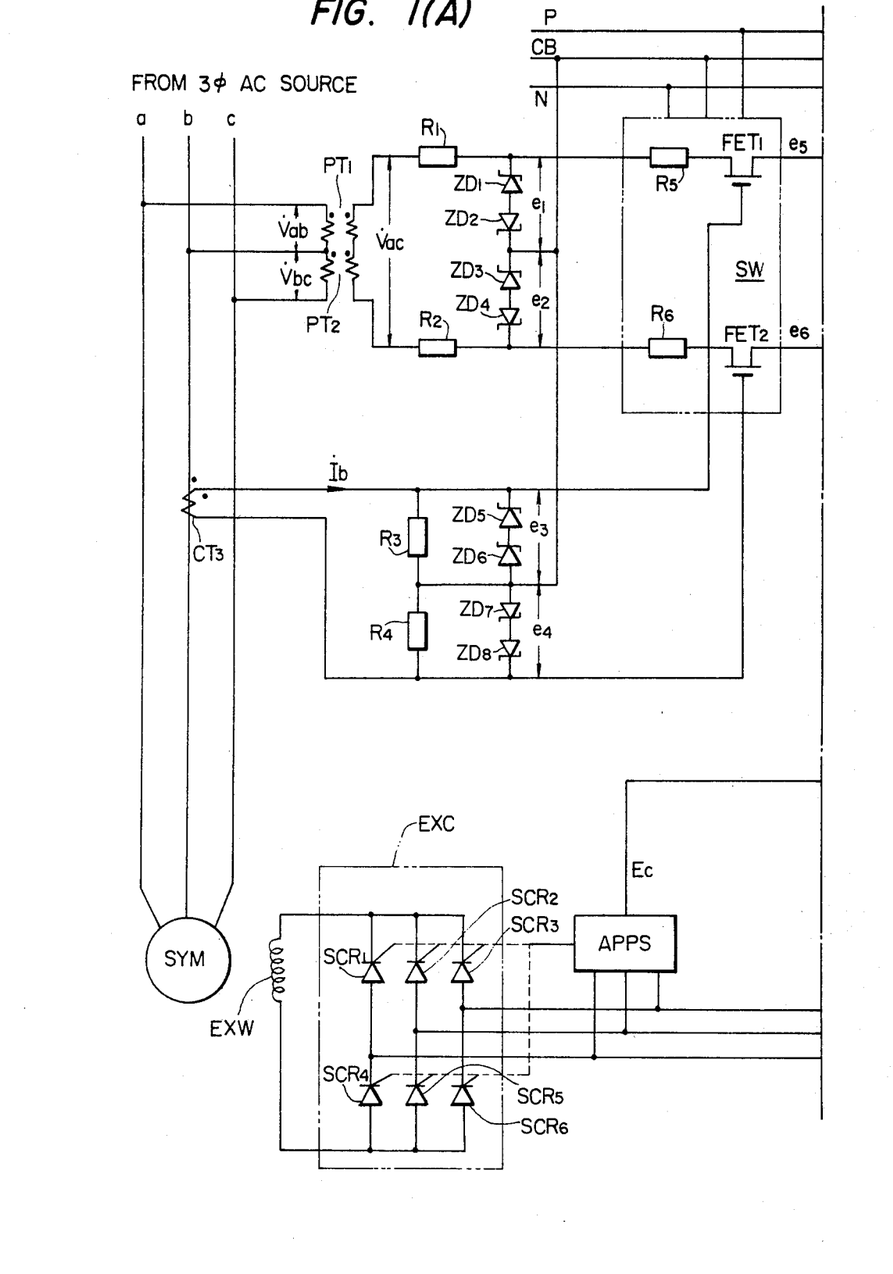
FIGS. 1(A) through 1(C) are block diagrams each showing the embodiment of the present invention.
Figure 1B:
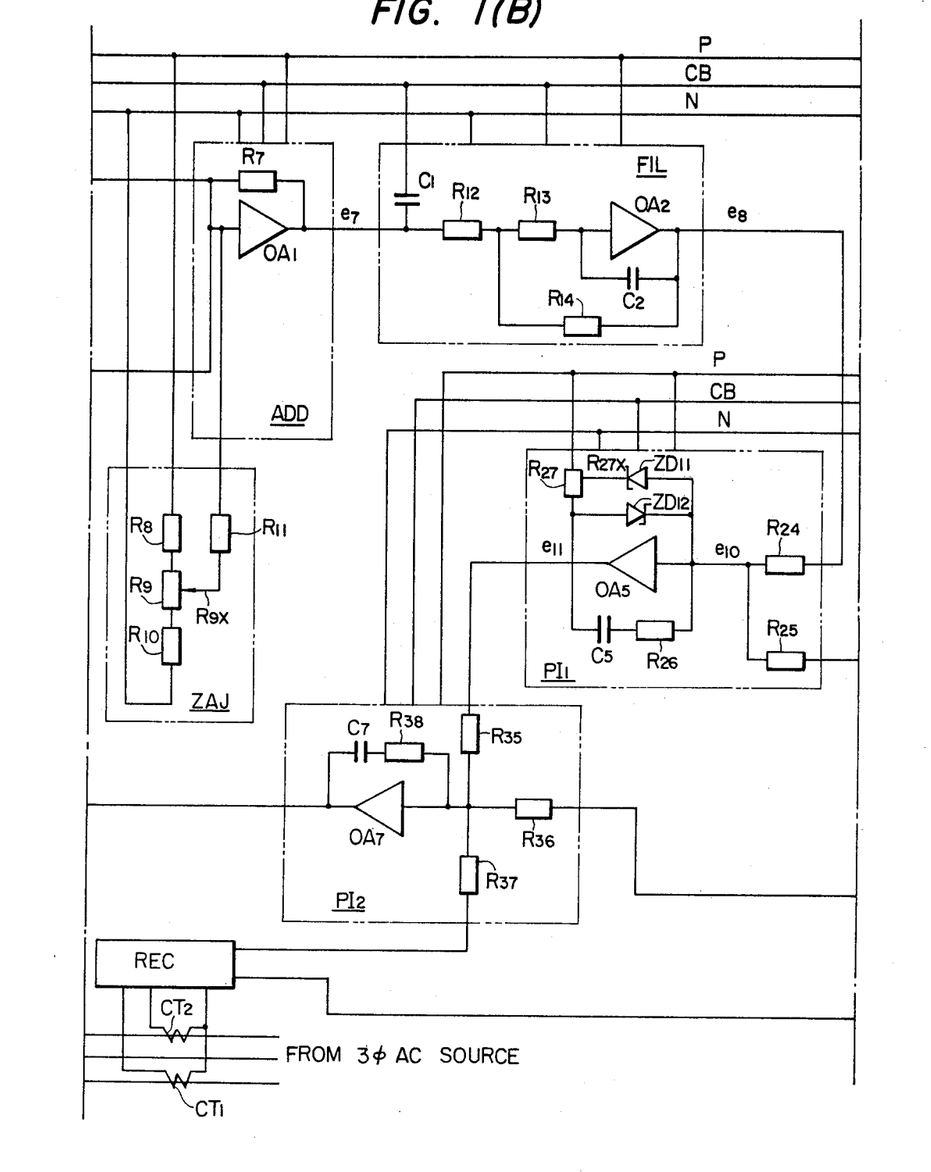
Figure 1C:
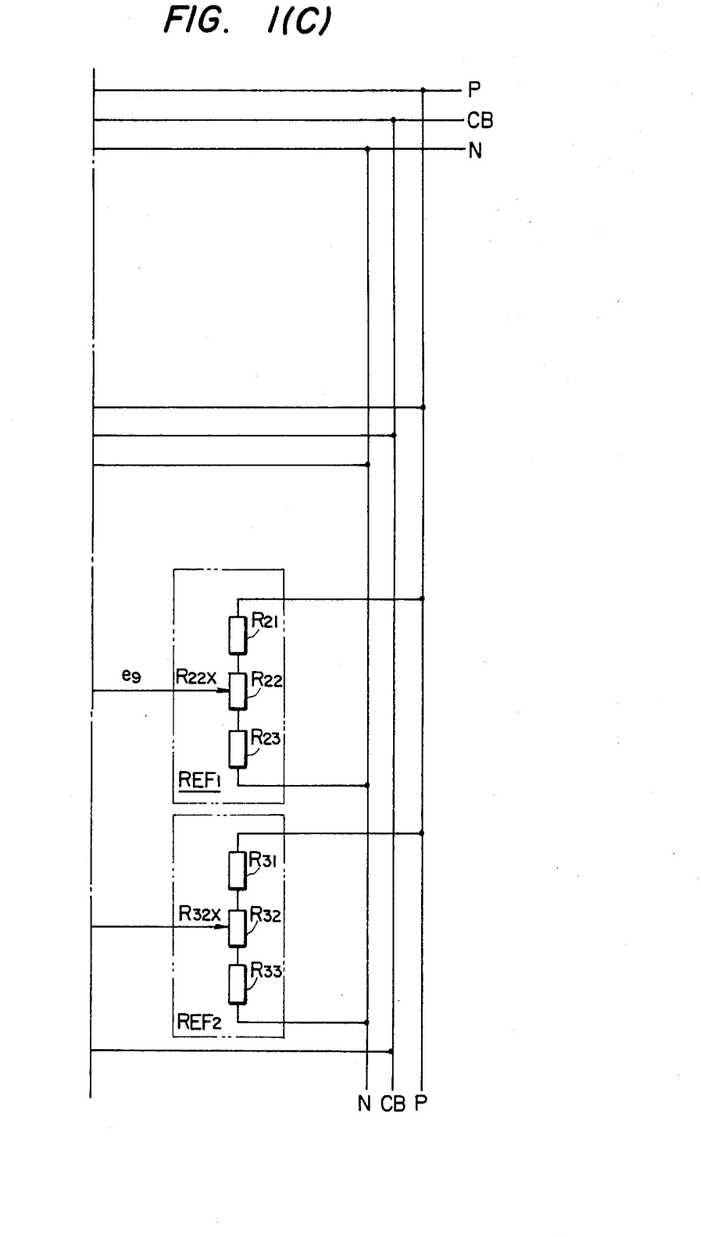
Figure 2:
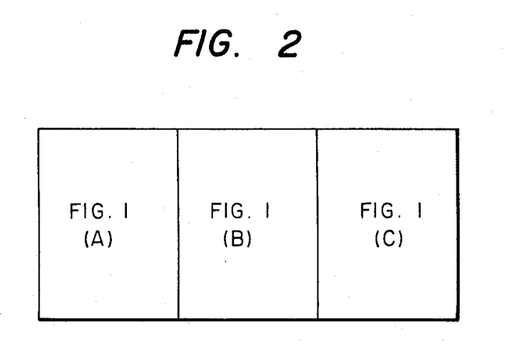
FIG. 2 is a block diagram showing the relationship of the blocks shown in FIGS. 1(A) through 1(C)

FIGS. 1(A) through 1(C) are block diagrams showing the embodiment of the present invention and these drawings correspond to the the block diagram of FIG. 2 which shows the arrangement of the synchronous motor and the control device in the finished form. In the drawings, SYM represents an armature winding of the synchronous motor and this armature winding is connected to a suitable three-phase AC power source which is not shown. EXW represents a field winding of the synchronous motor and the power factor can be controlled by controlling an exciting current to be passed through this winding. $SCR_1$ through $SCR_6$ represent thyristors that are gate-connected and together form an exciting circuit EXC. The DC output terminal of this circuit is connected to the field winding while its AC input terminal is connected to the suitable three-phase AC source. Control of the exciting current is made by controlling the firing angle of the thryistors. APPS represents an automatic pulse phase control circuit which applies a firing signal of a firing angle corresponding to a control signal $E_c$, which will be described elsewhere, to the abovementioned thyristors using the AC power source as the reference phase. REC represents a rectification circuit which receives the output of current transformers $CT_1$ and $CT_2$ which detect a current flowing through the exciting circuit EXC by means of AC power applied to the exciting circuit EXC, the current finally becoming a field current. The output of the circuit REC is used as a feed-back signal of the field current as will be described later.

$PT_1$ and $PT_2$ represent power transformers, respectively, and a line voltage $V_{ab}$ between a and b phases and a line voltage $V_{bc}$ between b and c phases of the AC voltage applied to the armature winding SYM are applied to their primary windings, respectively. The secondary windings of these transformers $PT_1$ and $PT_2$ are connected in series with each other and produce $V_{ab}+V_{bc}=V_{ac}$ as the output. $CT_3$ represents a current transformer which detects a b phase current $I_b$ flowing from the b phase of the AC power source to the armature winding SYM of the synchronous motor.

Figure 3:
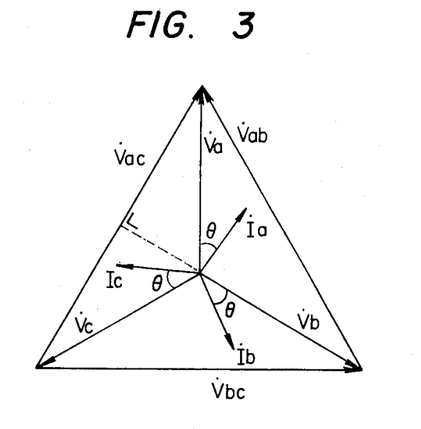
FIG. 3 is a vector diagram showing the relationship between the voltage and current of the synchronous motor used in the present invention.

FIG. 3 is a vector chart useful for explaining the phase relationship between the voltage and current. Va, Vb and Vc are phase voltages of the three-phase AC power source, respectively, and Vab and Vbc are line voltages between a-b and b-c, respectively. Vac is a line voltage between the phases a and c and is derived as a vector sum voltage of Vab and Vbc. Ia, Ib and Ic are phase currents of the phases a, b and c, respectively. $\theta$ is a phase difference between the phase voltage and phase current and the power factor of the synchronous motor is expressed in terms of Cos $\theta$. When the power factor is 1, the line voltage Vac has a phase which is different by 90 degrees from the phase current Ib and Vac is the leading phase. This phase difference becomes greater during the leading power factor and becomes smaller during the trailing power factor.

Turning back again to FIG. 1(A), $R_1$ and $R_2$ are current limiting resistors. $ZD_1$, $ZD_2$, $ZD_3$ and $ZD_4$ are zener diodes, respectively. As shown in the drawing, two diode pairs each consisting of two each diodes connected reversely are connected in series with each other and also in series with respect to the current limiting resistors $R_1$ and $R_2$. P, CB and N are auxiliary DC power buses, respectively, whereby P is held at a predetermined positive potential, CB at the ground potential and N at a predetermined negative potential. The intermediate point of the series circuit of the zener diodes $ZD_1$–$ZD_4$ is connected to the bus CB. Accordingly, voltages $e_1$ and $e_2$ having predetermined magnitude and opposite polarities to each other with respect to the ground potential appear at both ends of the series circuit of the zener diodes $ZD_1$–$ZD_4$ during the positive and negative half-wave periods of the AC voltage Vac. $R_3$ and $R_4$ are current-to-voltage inverting resistors, and voltages corresponding to the phase current Ib appear at their ends. $ZD_5$ through $ZD_8$ are zener diodes whereby $ZD_5$ and $ZD_6$ are connected with each other in series in the same direction and in parallel to the resistor $R_3$ while $ZD_7$ and $ZD_8$ are connected with each other in series in the same direction and in parallel to the resistor $R_4$. The series circuit of $ZD_5$ and $ZD_6$ is arranged reversely to the series circuit of $ZD_7$ and $ZD_8$ and the junction of these series circuits is connected to the bus CB. Accordingly, voltages $e_3$ and $e_4$ having predetermined magnitude and opposite polarities to each other with respect to the ground potential appear in these series circuits, respectively, during the positive and negative half-wave periods of the AC current.

SW is a switching circuit which is equipped with a series circuit consisting of a resistor $R_5$ and a switching element $FET_1$ (e.g. a field effect transistor) and with a series circuit consisting similarly of a resistor $R_6$ and a $FET_2$. The other ends of each of the resistors $R_5$ and $R_6$ are connected to the junctions between the zener diode $ZD_1$ and the resistor $R_1$ and between the zener diode $ZD_4$ and the resistor $R_2$, respectively. The control terminals of each of the switching elements $FET_1$ and $FET_2$ are connected to one end of each of the zener diodes $Z_5$, $Z_8$, respectively. Accordingly, the switching element $FET_1$ allows the passage of the voltage $e_1$ and produces a voltage $e_5$ during the period when the voltage $e_3$ at its control terminal is slightly negative relative to the ground potential. Similarly, the switching element $FET_2$ allows the passage of the voltage $e_2$ and generates a voltage $e_6$ during the period when the voltage $e_4$ at its control terminal is slightly negative relative to the ground potential. These switching elements $FET_1$ and $FET_2$ are arranged such that when their control terminals are at negative potentials and are turned on, other switching elements receive a large voltage at their control terminals and are thus kept OFF.

ADD represents an addition circuit which consists of an operational amplifier $OA_1$ and resistor $R_7$. ZAJ represents a zero-adjustment circuit which consists of three resistors $R_8$ through $R_{10}$, connected in series with one another, and a resistor $R_{11}$. Both ends of the series circuit of these three resistors are connected to the bus P of the positive potential and to the bus N of the negative potential, respectively. One end of the resistor $R_{11}$ is connected to an adjustable position terminal $R_{9x}$ of the resistor $R_9$ with the other connected to an input terminal of the operational amplifier $OA_1$. The output terminals of the switching elements $FET_1$ and $FET_2$ are also connected to the input terminal of the operational amplifier $OA_1$. Accordingly, a voltage $e_7$ which is the sum of the voltages $e_5$, $e_6$ and the voltage at the terminal $R_{9x}$ is obtained at the output terminal of the addition circuit ADD. In this instance, the resistors $R_5$, $R_6$, $R_7$ and $R_{11}$ have the same value.

Figure 4A:
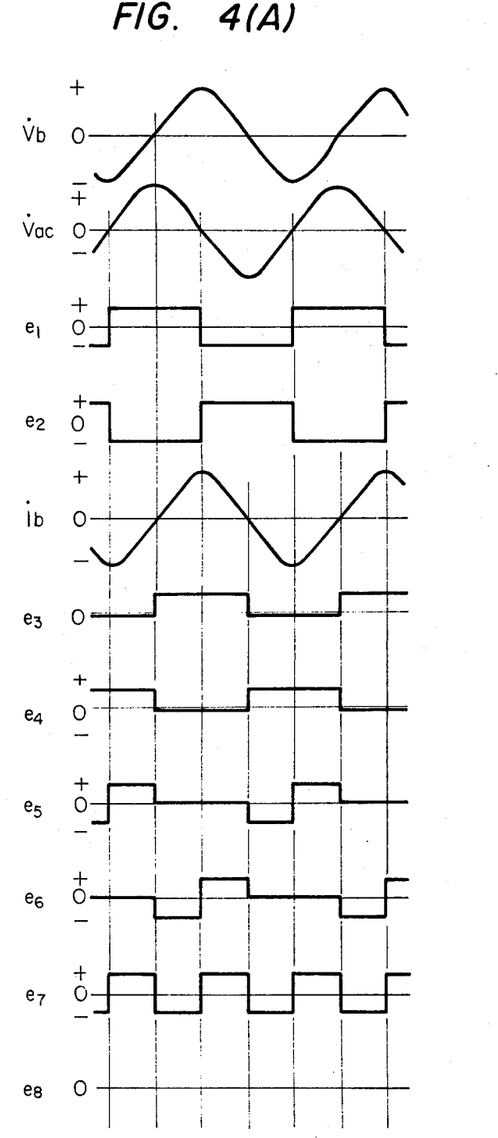
FIGS. 4(A) through 4(C) are waveform diagrams each useful for explaining the operation of the embodiment of the present invention.

In the waveform chart of FIG. 4, the abscissa represents the time and the ordinate the voltage. As can be seen clearly from this chart, when the power factor is 1, or, when $\theta = 0$, the phases of the voltages $e_1$ and $e_3$ deviate from each other by exactly 90 degrees in terms of the phase of the AC power source and this also holds true between the voltages $e_2$ and $e_4$. Hence, the voltages $e_5$ and $e_6$ appear symmetrically with respect to each other in both positive and negative polarities and consequently, the voltage $e_7$ as the sum of these voltages is symmetric with respect to the positive and negative and is obtained as a voltage of a square wave having a frequency which is twice that of $e_1$ (or $e_2$). In this case, if the positive and negative potentials of the voltage $e_5$ or $e_6$ are not equal to each other due to variance of the diode characteristics of $ZD_1$–$ZD_4$ or to variance of resistance of the resistors, the zero-adjustment circuit ZAJ compensates for the difference by means of the adjustment of the position of the terminal $R_{9x}$.

FIL is a so-called "active filter" which is a known circuit consisting of resistors $R_{12}$–$R_{14}$, capacitors $C_1$, $C_2$ and an operational amplifier $OA_2$. The input $e_7$ of this filter FIL is converted into the output $e_8$ after it is smoothed.

Figure 4B:
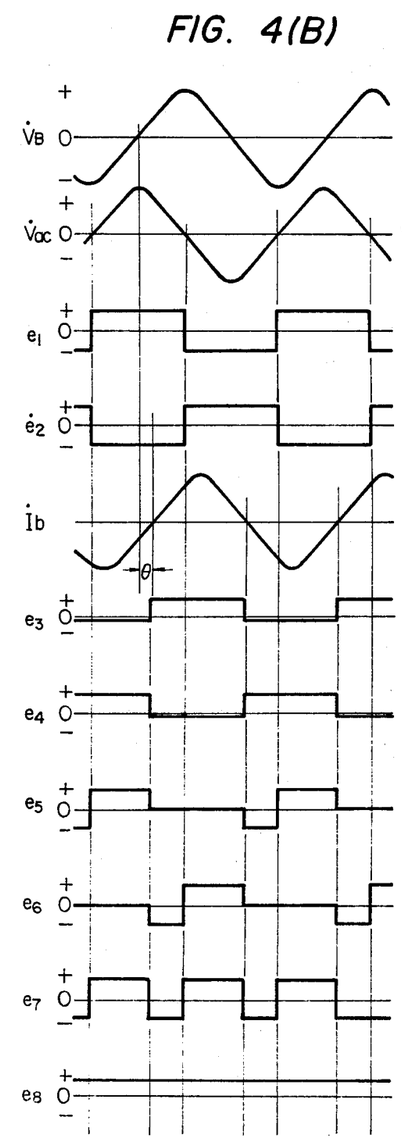
Figure 4C:
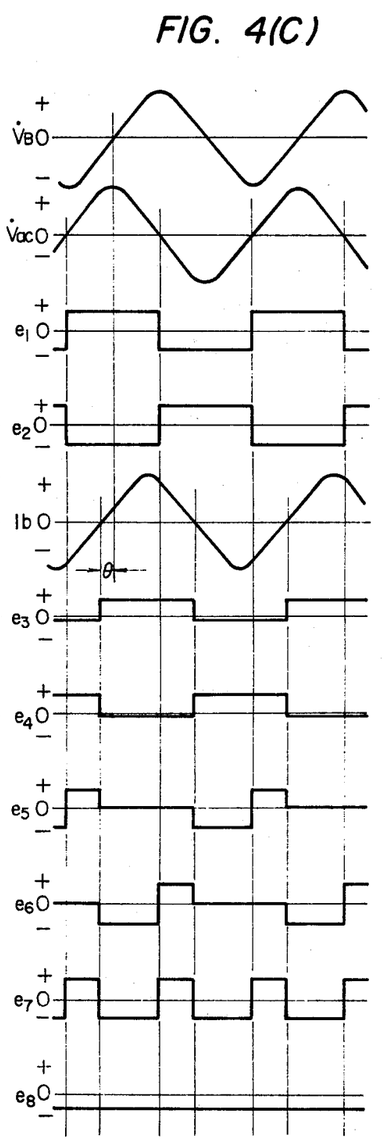

When the synchronous motor is operated at the power factor 1 as represented by the voltage $e_8$ in FIG. 4(A), the voltage $e_7$ appears symmetrically with respect to the positive and negative and, hence, the voltage $e_8$ becomes zero. FIGS. 4(B) and 4(C) show the waveform at each portion in the cases of the leading power factor and the trialing power factor, respectively. In the case of the trailing power factor, the period in which both voltages $e_5$ and $e_6$ are positive is longer. In consequence, the voltage $e_7$ as the sum of $e_5$ and $e_6$ has a longer positive period and repeatedly describes the waveform in which the positive period is longer than the negative period. Thus, there is obtained a positive voltage as represented by $e_8$. In the case of the leading power factor, on the other hand, the period in which the voltages $e_5$ and $e_6$ are negative is longer. Accordingly, the voltage $e_7$ as the sum of the voltages $e_5$ and $e_6$ describes repeatedly a square wave in which the negative period is longer. There is thus obtained a negative voltage as the voltage $e_8$. In other words, the voltage $e_8$ can be used as a signal representative of the polarity and of the varying power factor in accordance with the power factor of the synchronous motor.

Figure 5:
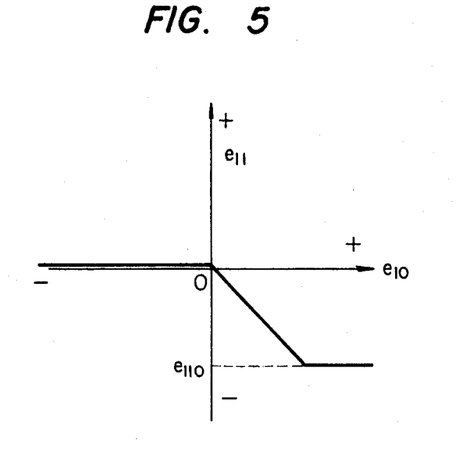
FIG. 5 is a diagram showing the input-output characteristics of the signal synthesizing circuit to be used in the embodiment of the present invention.

$REF_1$ is a power factor target setting circuit which consists of three resistors $R_{21}$, $R_{22}$ and $R_{23}$ that are connected in series between the auxiliary DC power buses P and N. $R_{22x}$ is a variable position terminal of the resistor $R_{22}$. $PI_1$ represents a saturable proportional integration circuit consisting of resistors $R_{24}$, $R_{25}$, $R_{26}$ and $R_{27}$, zenor diodes $ZD_{11}$ and $ZD_{12}$, a capacitor $C_5$ and an operational amplifier $OA_5$, each of said members connected as illustrated in FIG. 1(C). One end of the resistor 24 is connected to the output terminal of the filter FIL while one end of the resistor 25 is connected to the variable position terminal $R_{22x}$ of the resistor $R_{22}$. Here, these resistors have the same resistance. In this circuit the relationship between the input voltage $e_{10}$ of the operational amplifier $OA_5$, which voltage $e_{10}$ is the sum of the output voltage $e_8$ of the filter FIL and the voltage $e_9$ at the variable position terminal $R_{22x}$ of the resistor $R_{22}$, and the output voltage $e_{11}$, is shown in FIG. 5. In this drawing, the output voltage $e_{110}$ is determined by the voltage at the variable position terminal $R_{27x}$ of the resistor $R_{27}$. That is to say, when the synchronous motor is operated at a power factor set by the power factor target setting circuit $REF_1$, the output is substantially zero and when the power factor varies within a predetermined range, it produces a voltage $e_a$ that falls within the range of from zero to $e_{110}$.

$REF_2$ is a field current target setting circuit which consists of three resistors $R_{31}$, $R_{32}$ and $R_{33}$ connected in series between the auxiliary DC power buses P and N. $R_{32x}$ is a variable position terminal of the resistor $R_{32}$. $PI_2$ represents a proportional integration circuit consisting resistors $R_{35}$, $R_{37}$ and $R_{38}$, a capacitor $C_7$ and an operational amplifier $OA_7$, each member connected as shown in the drawing. One end of the resistor $R_{35}$ is connected to the output terminal of the saturable proportional integration circuit $PI_1$. One end of the resistor $R_{36}$ is connected to the variable position terminal $R_{32x}$ of the resistor $R_{32}$ and one end of the resistor $R_{37}$ is connected to the aforementioned rectification circuit REC. Here, the arrangement is made in such a manner that the voltage obtained at the terminal $R_{32x}$ has the opposite polarity to the voltage supplied from the rectification circuit REC. Accordingly, the proportional integration circuit $PI_2$ produces an output $e_c$ obtained by compensating for the difference between the voltage provided by the field current setting circuit $REF_2$ and the voltage supplied by the rectification circuit REC by means of the output of the saturable proportional integration circuit $PI_1$. Since the aforementioned automatic pulse phase control circuit APPS receives the output voltage $e_c$ of the proportional integration circuit $PI_2$, it produces finally a firing pulse having such a phase as to compensate for, and control, the field current so as to bring the power factor of the synchronous motor to a desired value while controlling the field current to the target value.

Figure 6:
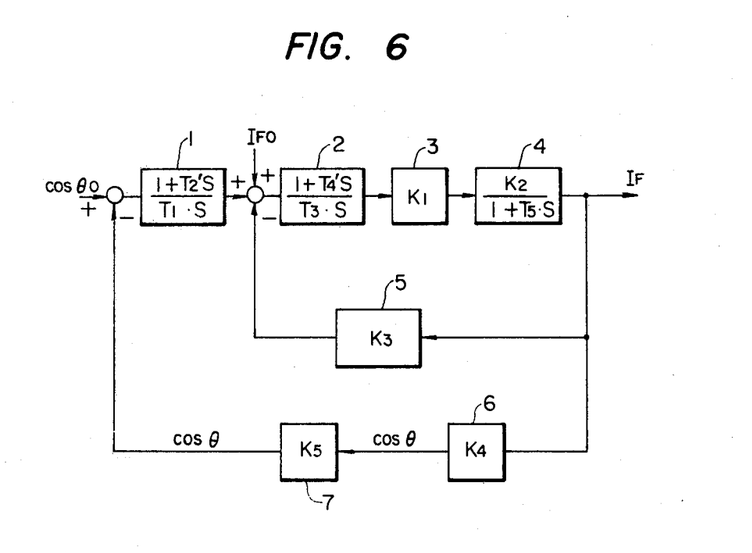
FIG. 6 is a block diagram useful for explaining the control in terms of the transmission functions in the embodiment of the present invention.

FIG. 6 shows the embodiment of FIG. 1 in terms of the transfer function blocks. In this drawing, $T_1$-$T_5$ are time constants, $K_1$-$K_5$ are proportional constants and S is a Laplace operator. Reference numeral 1 represents a block representative of the state where the saturable proportional integration circuit $PI_1$ is saturated; 2 is a block representative of the proportional integration operational circuit $PI_2$; 3 is a block representative of the exciting circuit EXC; 4 is a block representative of the exciting winding; 5 is a block representative of the current transformers $CT_1$, $CT_2$ and the rectification circuit REC; 6 is a block representative of the field current-to-power factor conversion function of the synchronous motor; 7 is a block representative of a circuit including the power transformers $PT_1$, $PT_2$ the current transformer $CT_3$ and the adder ADD; and $\cos \theta$ and $I_{FO}$ represent the power factor target value and the field current target value, respectively.

In the present invention, since the signal representing the power factor of the synchronous motor can be obtained continuously, the power factor detection is substantially free from the time lag in comparison with the time constant of the proportional integration and hence, control can be made stably and continuously.

We claim:

1. A power factor detecting apparatus for a machine supplied with a three phase A.C. voltage comprising:
   a potential transformer for detecting a line voltage applied to said machine;
   a current transformer for detecting a phase current supplied to said machine, wherein said phase current is selected to have a phase difference of 90° with respect to said line voltage when said machine is operated at a power factor of 1;
   first means for producing a first alternating current having a rectangular waveform with positive and negative polarities corresponding to an output of said potential transformer and for producing a second alternating current having a rectangular waveform with positive and negative polarities corresponding to said output of said potential transformer, wherein said first and second alternating currents are 180° out of phase with one another, and wherein said first and second alternating currents have a substantially identical predetermined amplitude;
   second means for producing first and second gate signals which have positive and negative polarities corresponding to an output of said current transformer and which are 180° out of phase with one another;
   first switching means for passing said first alternating current to produce a first output signal having positive and negative polarities when said first gate signal has a predetermined polarity;
   second switching means for passing said second alternating current to produce a second output signal having positive and negative polarities when said second gate signal has said predetermined polarity;
   an adder for adding said first and second outputs of said first and second switching means to produce an adder output signal which has the positive and negative polarities and amplitude of said first and second output signals and a duty cycle of 90° when said machine is operated at a power factor of 1; and
   a filtering means for removing an alternating current component from said adder output so that an output of the filtering means represents a power factor of said machine, wherein a first polarity of the output of the filtering means represents a leading power factor of said machine and wherein a second polarity of the output of the filtering means represents a lagging power factor, and further wherein a magnitude of the output of the filtering means represents a magnitude of the power factor of said machine.

2. A power factor detecting apparatus according to claim 1, wherein said predetermined polarity of said first and second gate signals is their negative polarity.

3. A power factor detecting apparatus according to claim 1, wherein said predetermined polarity of said first and second gate signals is their positive polarity.

4. A power factor detecting apparatus according to claim 1, wherein said adder includes a zero adjusting means for adjusting a zero line of an output of said adder so that the zero line is placed on center of the output of said adder.

5. A field current control system for a synchronous machine supplied with a three phase A.C. voltage comprising:
   a potential transformer for detecting a line voltage applied to said machine;

a current transformer for detecting a phase current supplied to said machine, wherein said phase current is selected to have a phase difference of 90° with respect to said line voltage when said machine is operated at a power factor of 1;

first means for producing a first alternating current having a rectangular waveform with positive and negative polarities corresponding to an output of said potential transformer and for producing a second alternating current having a rectangular waveform with positive and negative polarities corresponding to said output of said potential transformer, wherein said first and second alternating currents are 180° out of phase with one another, and wherein said first and second alternating currents have a substantially identical predetermined amplitude;

second means for producing first and second gate signals which have positive and negative polarities corresponding to an output of said current transformer and which are 180° out of phase with one another;

first switching means for passing said first alternating current to produce a first output signal having positive and negative polarities when said first gate signal has a predetermined polarity;

second switching means for passing said second alternating current to produce a second output signal having positive and negative polarities when said second gate signal has said predetermined polarity;

an adder for adding said first and second outputs of said first and second switcing means to produce an adder output signal which has the positive and negative polarities and amplitude of said first and second output signals and a duty cycle of 90° when said machine is operated at a power factor of 1;

a filtering means for removing an alternating current component from said adder output so that an output of the filtering means represents a power factor of said machine, wherein a first polarity of the output of the filtering means represents a leading power factor of said machine and wherein a second polarity of the output of the filtering means represents a lagging power factor, and further wherein a magnitude of the output of the filtering means represents a magnitude of the power factor of said machine;

third means for detecting a field current of said synchronous machine;

fourth means for setting a target value of said field current when said synchronous machine is operated at a predetermined load and a predetermined power factor; and fifth means coupled to the outputs of said filtering means and said third and fourth means for delivering a field current control signal for said synchronous machine indicative of the difference between the output signal of said third means and the output signal of said fourth means, said field current control signal being compensated by the output of said filtering means.

6. The field current control system as defined in claim 5, wherein said adder includes a zero adjusting means for adjusting a zero line of an output of said adder so that the zero line is placed on center of the output of said adder.

7. The field current control system as defined in claim 5, wherein said predetermined polarity of said first and second gate signals is their negative polarity.

8. The field current control system as defined in claim 5, wherein said predetermined polarity of said first and second gate signals is their positive polarity.

9. The field current control system as defined in claim 5, wherein the output of said filtering means is coupled to a means for generating a signal corresponding to the present operating power factor only when the output signal of said filtering means changes within a predetermined range and for holding a signal of a predetermined value when the output signal of said filtering means is within ranges other than said predetermined range.

10. A power factor detecting apparatus for continuously monitoring and indicating the power factor for a machine supplied with a three phase A.C. voltage comprising:

a potential transformer for detecting a line voltage applied to said machine;

a current transformer for detecting a phase current supplied to said machine, wherein said phase current is selected to have a phase difference of 90° with respect to said line voltage when said machine is operated at a power factor of 1;

first means for producing a first alternating current having a rectangular waveform with positive and negative polarities corresponding to an output of said potential transformer and for producing a second alternating current having a rectangular waveform with positive and negative polarities corresponding to said output of said potential transformer, wherein said first and second alternating currents are 180° out of phase with one another, and wherein said first and second alternating currents have a substantially identical predetermined amplitude;

second means for producing first and second gate signals which have positive and negative polarities corresponding to an output of said current transformer and which are 180° out of phase with one another;

first switching means for passing said first alternating current to produce a first output signal having positive and negative polarities when said first gate signal has a predetermined polarity;

second switching means for passing said second alternating current to produce a second output signal having positive and negative polarities when said second gate signal has said predetermined polarity;

an adder for continuously adding said first and second outputs of said first and second switching means to continuously produce an adder output signal which has the positive and negative polarities and amplitude of said first and second output signals and a duty cycle of 90° when said machine is operated at a power factor of 1; and a filtering means for removing an alternating current component from said adder output so that an output of the filtering means continuously represents a power factor of said machine, wherein a first polarity of the output of the filtering means represents a leading power factor of said machine and wherein a second polarity of the output of the filtering means represents a lagging power factor, and further wherein a magnitude of the output of the filtering means represents a magnitude of the power factor of said machine.

* * * * *